United States Patent
Sylvester

(10) Patent No.: US 7,588,744 B1
(45) Date of Patent: Sep. 15, 2009

(54) METHOD OF RECOVERING PHOSPHATE FOR REUSE AS A FERTILIZER

(75) Inventor: Paul Sylvester, Waltham, MA (US)

(73) Assignee: Layne Christensen Company, Mission Woods, KS (US)

( * ) Notice: Subject to any disclaimer, the term of this patent is extended or adjusted under 35 U.S.C. 154(b) by 0 days.

(21) Appl. No.: 12/474,027

(22) Filed: May 28, 2009

Related U.S. Application Data

(60) Provisional application No. 61/120,549, filed on Dec. 8, 2008.

(51) Int. Cl.
- *B01J 49/00* (2006.01)
- *C01B 25/02* (2006.01)
- *C01B 25/26* (2006.01)
- *C01B 25/30* (2006.01)
- *C01B 25/41* (2006.01)
- *C05B 7/00* (2006.01)

(52) U.S. Cl. .............. 423/299; 71/32; 71/33; 71/34; 71/35; 71/64.1; 210/670; 210/906; 423/305; 423/308; 423/312; 423/315

(58) Field of Classification Search .......... 210/906, 210/670; 423/299, 305, 308, 312, 315; 71/64.1, 71/32, 33, 34, 35
See application file for complete search history.

(56) References Cited

U.S. PATENT DOCUMENTS

| | | | | |
|---|---|---|---|---|
| 3,499,837 A | * | 3/1970 | Jaunarajs | 210/679 |
| 4,477,355 A | * | 10/1984 | Liberti et al. | 210/665 |
| 5,110,578 A | * | 5/1992 | Abidaud | 423/202 |
| 6,132,624 A | * | 10/2000 | Suzuki et al. | 210/723 |
| 6,136,199 A | | 10/2000 | SenGupta | |
| 6,146,539 A | * | 11/2000 | Mills | 210/712 |
| 6,274,105 B1 | * | 8/2001 | Vorage et al. | 423/181 |
| 7,291,578 B2 | | 11/2007 | SenGupta | |
| 7,517,514 B2 | * | 4/2009 | Jarventie | 423/317 |
| 2009/0028770 A1 | * | 1/2009 | Mae et al. | 423/304 |

FOREIGN PATENT DOCUMENTS

| | | | |
|---|---|---|---|
| JP | 56-62539 | * | 5/1981 |
| WO | WO 2008/056331 | | 5/2008 |

OTHER PUBLICATIONS

Blaney et al., Hybrid anion exchanger for trace phosphate removal from water and wastewater, Water Research 41 (2007) pp. 1603-1613.

Kumar et al., Beneficial phosphate recover from reverse osmosis (RO) concentrate of an integrated membrane system using polymeric ligand exchange (PLE), Water Research 41 (2007) pp. 2211-2219.

Burns et al., Laboratory and In-Situ Reductions of Soluble Phosphorus in Liquid Swine Waste Slurries, Environmental Technology. 22 (2001) 1273-1278.

* cited by examiner

*Primary Examiner*—Wayne Langel
(74) *Attorney, Agent, or Firm*—Thompson Hine LLP

(57) ABSTRACT

A method for removing and recovering phosphorus from a spent adsorbent medium to result in a regenerated medium and a phosphorus-containing solution useful as a fertilizer.

12 Claims, 1 Drawing Sheet

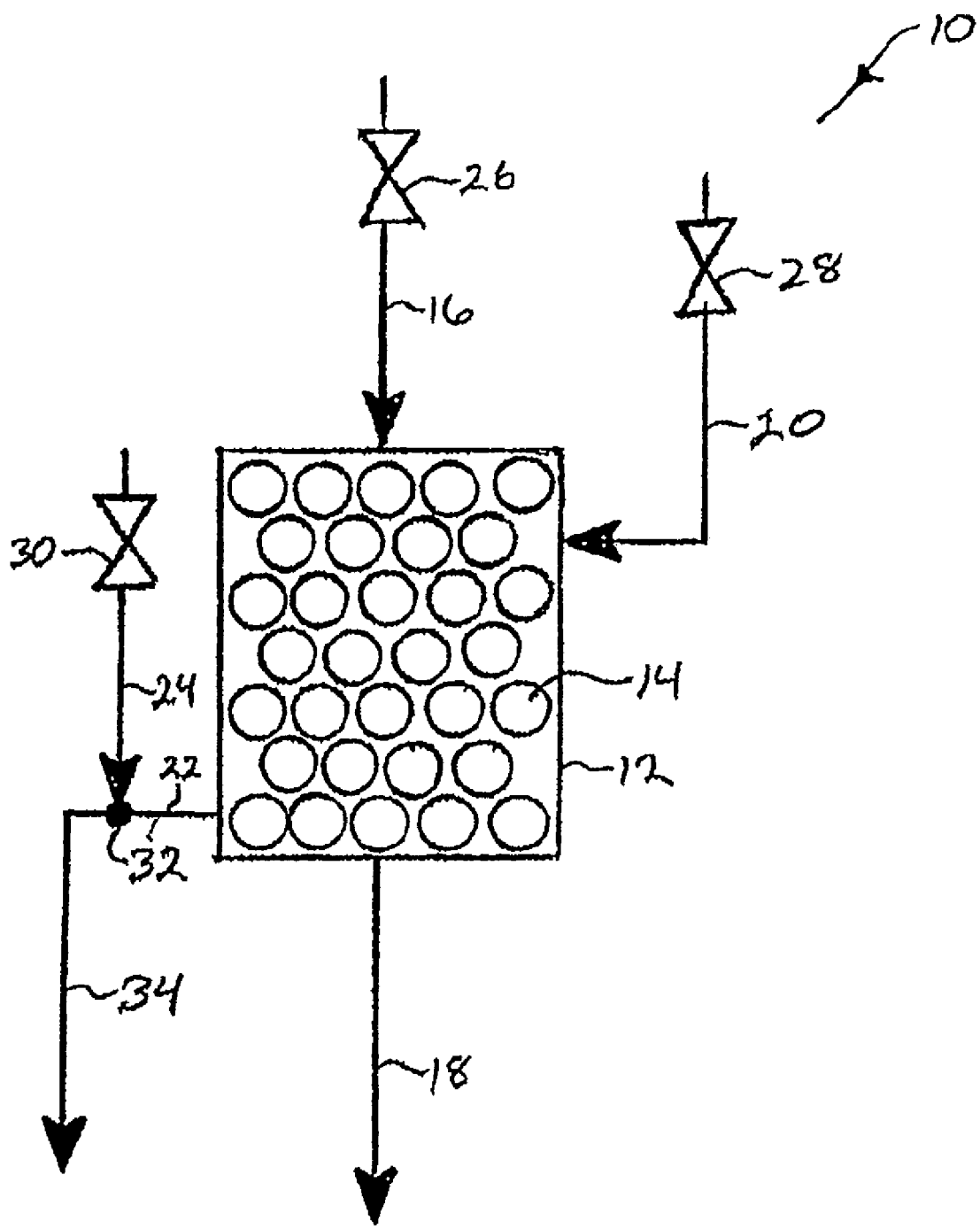

METHOD OF RECOVERING PHOSPHATE FOR REUSE AS A FERTILIZER

This patent application claims priority from U.S. Ser. No. 61/120,549 filed on Dec. 8, 2008, the entire contents of which are incorporated herein by reference, and U.S. Ser. No. 12/399,643 filed on Mar. 6, 2009, the entire contents of which are incorporated herein by reference.

A method of producing a composition suitable for use as a fertilizer from a regenerated spent adsorptive medium, also termed a spent sorbent or a spent adsorbent, that removes phosphate from an influent stream.

The resulting phosphate-containing composition is formulated to add nitrogen and potassium, to mimic a composition in commercially available fertilizer blends. Such blends are referred to as NPK blends; they typically contain nitrogen N in the form of nitrate or ammonium, phosphorus P in the form of phosphate, and potassium K ions.

In one embodiment, the resultant composition, which contains nitrate, phosphorus, and potassium, is used as a liquid fertilizer. In one embodiment, the resultant composition is further concentrated for other uses. In one embodiment, ammonium phosphate, ammonium nitrate, and/or other nitrogen and/or phosphorus salts are added to the composition to alter the ratios of nitrogen, phosphorus, and/or potassium to a desired N:P:K ratio. In one embodiment, the composition is further treated to produce a concentrate, a precipitate, and/or a mixture of precipitates for use as a fertilizer.

A spent adsorptive medium is one that has been used to remove at least one component from an input stream or source. In one embodiment, the medium is an ion-exchange resin. In one embodiment, the medium is a metal oxide adsorbent. Examples include granular ferric oxide (GFO), and granular ferric hydroxide (GFO) adsorbents. In one embodiment, the medium is a hybrid resin. Any medium that is regenerated using caustics may be used. In the method, the input source or stream contains phosphate. This may be, e.g., the effluent from a wastewater treatment plant. Contact with the medium desirably adsorbs phosphate, so that the effluent has a reduced concentration of phosphate compared to the input. In the method, phosphate is removed from an input source or stream using any of these media.

The phosphate-containing spent sorbent is regenerated by contacting it with a solution containing potassium hydroxide (KOH), e.g., in an influent stream, herein termed a regenerant solution or regenerant influent stream. The KOH-containing solution displaces and thus removes phosphate anions, e.g., $PO_4^{3-}$, from the adsorbent, resulting in a regenerated adsorbent that can be used for further phosphate removal.

The resulting phosphate- and potassium-containing eluant solution, also referred to as a desorbant solution or a regenerant effluent stream, is then neutralized with nitric acid ($HNO_3$) to result in a neutralizer solution or neutralizer stream containing potassium, nitrate, and phosphate ions.

The phosphate-containing spent sorbent is thus regenerated, and the final product stream has a beneficial use, in contrast to being a waste product that requires disposal. The method is thus ecologically friendly; it permits beneficial use of a waste product which, absent the method, would otherwise be discarded.

The concentration of KOH in the regenerant solution ranges from about 0.1% w/v to about 10% w/v. The concentration of $HNO_3$ in the neutralizer solution ranges from about 1% w/v to about 70% w/v.

In one embodiment, spent sorbent is collected then, at a suitable time, the collected spent sorbent is regenerated in a single batch. A time may be selected for convenience, upon attainment of a sufficient volume, etc.

In one embodiment, a regenerant stream is neutralized as it is generated. The sole drawing illustrates one configuration of a system using this embodiment. Other system configurations may be used, e.g., those employing different methods to contact the sorbent with a process and/or regenerant influent stream. Other systems may also be configured to use the disclosed method.

With reference to the drawing, system 10 may include a vessel or other containment device 12 containing an adsorbent 14, a process influent or input stream 16 thought to contain phosphate species, control device 26 to operationally regulate flow (e.g., control the flow rate) of process influent stream 16, an effluent stream 18 with a reduced, negligible, or zero concentration of phosphate species that is collected to be reused, further processed, or discarded; a KOH containing regenerant influent stream 20; control device 28 to operationally regulate flow of regenerant influent stream 20; a regenerant effluent stream 22 containing desorbed phosphate; a neutralizer stream 24 supplying nitric acid ($HNO_3$); control device 30 to operationally regulate flow of the neutralizer stream 20; and a final product stream 34, or second effluent stream, that is collected in a suitable containing device. One type of control device is a valve; however other types of control devices may be used, as known to a person of ordinary skill in the art. In the drawing, valve 26 controls the flow rate of the process influent stream 16, valve 28 controls the flow rate of the regenerant influent stream 20, and valve 30 controls the flow rate of the neutralizer stream 24. Containment device 12 may be any appropriate vessel capable of containing adsorbent material 14, e.g., a tank, a column, a reactor such as a tube reactor, etc., while permitting process influent stream 16 to pass through. The containment device 12 volume may be selected based upon factors such as volume and capacity of the spent adsorbent, the flow rate of the process influent stream 16, etc.

The adsorbent 14 to be regenerated may be in various physical forms, e.g., particles, beads, granules, etc. Any adsorbent 14 that is capable of sorbing phosphate species from solution may be used, whether sorption occurs by adsorption, absorption, or otherwise. Examples of adsorbents that can be used in the method include, but are not limited to, ferric oxides and hydroxides, e.g., Sorb 33 (Severn Trent Services, Fort Washington Pa.); GFH; titanium dioxide (e.g., Adsorbsia Dow Chemical Co., Midland Mich.; Metsorb Graver Technologies); zirconium dioxide (e.g. Isolux, MEI, Flemington N.J.); hybrid media of metal oxides immobilized onto a polymer (e.g., ArsenX$^{np}$); or an ion exchange resin, as disclosed in U.S. Pat. No. 7,291,578. In one embodiment, sorbent 14 is an ion exchange resin having iron impregnated thereon and/or therein. In one embodiment, the iron is in the form of iron oxide nanoparticles. In one embodiment, sorbent 14 is ArsenX$^{np}$™ sorbent material (SolmeteX, Inc., Northborough Mass.).

Process influent stream 16 may be any stream containing or capable of containing phosphate species dissolved in the stream. Phosphate species include elemental phosphorus, phosphates, polyphosphates, pyrophosphates, organic phosphate salts, and/or phosphate anions. In one embodiment the influent is a water stream. In one embodiment the influent is a wastewater stream. In one embodiment the influent is a groundwater stream. Phosphates may be inorganic phosphates and/or organic phosphates, and may form various ions in solution, such as phosphate ions $PO_4^{3-}$, hydrogen phosphate ions $HPO_4^{2-}$, and dihydrogen phosphate ions $H_2PO_4^-$.

In use, process influent stream 16 passes through adsorbent 14 in containment device 12, and phosphates in the process influent stream are removed by sorption on or in sorbent 14, thereby reducing the phosphate concentration and resulting in process effluent stream 18 with a decreased phosphate concentration. The amount of phosphate reduction between the process influent stream 16 and process effluent stream 18 may be a function of many factors, including the type of phosphate material in the process influent stream, the pH of the influent stream, the quantity of adsorbent 14 in containment device 12, the flow rate of process influent stream 16, the type of adsorbent 14, the residence time T of the process influent stream, which may be calculated as T=V/R where V is the volume of the containment device 12 and R is the flow rate of the process influent stream 16. The residence time T may be selected based upon the type of adsorbent 14, the degree of sorption desired, and other factors.

After a certain volume of process influent stream 16 has passed through adsorbent 14, the adsorbent 14 may become loaded with phosphate material to the point where the desired reduction in phosphate concentration will no longer be achieved. At this point, or at any other desired time, adsorbent 14 may be regenerated by stopping flow of the process influent stream 16 (e.g., by regulating control device 26), and initiating flow of the regenerant influent stream 20 through the adsorbent 14 (e.g., by regulating valve control device 28).

The concentration of KOH in the regenerant influent stream 20, and the flow rate of the regenerant influent stream 20, are process variables that may be controlled to achieve the desired degree of adsorbent regeneration at the desired cost efficiency, process efficiency, etc.

In one embodiment, regenerant influent stream 20 is an aqueous KOH solution. In one embodiment, regenerant influent stream 20 contains between 5% w/v KOH to 10% w/v KOH. In one embodiment, regenerant influent stream 20 contains between 5% w/v KOH to 15% w/v KOH. In one embodiment, regenerant influent stream 20 contains about 5% w/v KOH. In one embodiment, regenerant influent stream 20 contains about 10% w/v KOH. In one embodiment, regenerant influent stream 20 contains about 15% w/v KOH. In one embodiment, regenerant influent stream 20 contains up to 20% KOH.

In one embodiment, the flow rate of the regenerant influent stream 20 is between about 0.5 bed volume per hour (BV/hr) and 2 BV/hr. In one embodiment, the flow rate of the regenerant influent stream is between about 2 BV/hr and 10 BV/hr. In one embodiment, the flow rate of the regenerant influent stream is between about 10 BV/hr and about 20 BV/hr.

In embodiments, regenerant influent stream 20 may include additional components, such as surfactants, biocides, sulfates, nitrates, ammonium hydroxide, ammonium salts, etc.

As the KOH-containing regenerant influent stream 20 contacts sorbent 14, the phosphate in and/or on the spent sorbent 14 reacts with and is displaced by hydroxide anions (OH$^-$). The resulting reaction products, regenerant solution and desorbed phosphate anions, are removed in regeneration effluent stream 22 to form, in one embodiment, a byproduct solution stream containing potassium and phosphorus that has a relatively basic pH. In one embodiment, the pH ranges from pH 10 to pH 15. In one embodiment, the pH is about 13.

As shown in the drawing, regeneration effluent stream 22 mixes with neutralizer stream 24 at junction 32, to form final product stream 34. In one embodiment, neutralizer stream 24 is an aqueous solution of HNO$_3$. In one embodiment, the concentration of HNO$_3$ ranges between about 1% to about 70% w/v. In one embodiment, the concentration of HNO$_3$ is about 5% w/v. In one embodiment, the concentration of HNO$_3$ is about 10% w/v. In one embodiment, the concentration of HNO$_3$ is about 20% w/v. In one embodiment, the concentration of HNO$_3$ is about 30% w/v. In one embodiment, the concentration of HNO$_3$ is about 50% w/v. In one embodiment, the concentration of HNO$_3$ is about 70% w/v. In embodiments, neutralizer stream 24 may include additional components, such as surfactants, biocides, sulfates, ammonium salts, etc.

Final product stream 34 may have a substantially neutral pH due to the reaction of the acidic neutralizer stream 24 with the basic regeneration stream 22. In one embodiment the pH of final product stream 34 is about 7.0. In one embodiment, the pH of final product stream 34 ranges from about pH 6.7 to about pH 7.6. In one embodiment, the pH of final product stream 34 ranges from about pH 6.0 to about pH 8.5.

In the method, when the phosphorus material is a phosphate, the final product stream 34 contains potassium, phosphate, and nitrate ions. The final product stream 34 can be used as a nitrogen/phosphorus/potassium-containing liquid fertilizer. It may be further treated to produce a concentrate, a precipitate, or a mixture of precipitates including potassium, phosphate, and nitrate salt species. In one embodiment, the concentration of at least one component, i.e., K, N, and/or P, can be adjusted to a desired product specification, such as a desired concentration of K, N, and/or P, or a desired N:P:K ratio, by using potassium phosphate, potassium nitrate, ammonium nitrate, ammonium phosphate, and/or other nitrogen, phosphorus, or potassium containing salts as appropriate.

The following non-limiting examples further describe the invention.

EXAMPLE 1

Nature's Lawn and Garden Inc. market two concentrated liquid fertilizers: Lawn Fertilizer containing 16% nitrogen, 4% phosphate (as $P_2O_5$) and 8% soluble potash (as $K_2O$), and All-Purpose Plant Food containing 10% nitrogen, 8% phosphate (as $P_2O_5$) and 8% soluble potash (as $K_2O$). Typical application rates for these two fertilizers are 1-2 oz per gallon of water. The concentrations of nitrogen, $P_2O_5$ and $K_2O$ in the applied solution are shown in Tables 1 and 2.

TABLE 1

Application concentration for Lawn Fertilizer

| Component | 1 oz per gallon dilution | 2 oz per gallon dilution |
|---|---|---|
| Nitrogen | 0.125% | 0.250% |
| $P_2O_5$ | 0.031% | 0.063% |
| $K_2O$ | 0.063% | 0.125% |

TABLE 2

Application concentration for All Purpose Plant Food

| Component | 1 oz per gallon dilution | 2 oz per gallon dilution |
|---|---|---|
| Nitrogen | 0.078% | 0.156% |
| $P_2O_5$ | 0.063% | 0.125% |
| $K_2O$ | 0.063% | 0.125% |

EXAMPLE 2

A water influent containing 3 mg/L phosphate is passed through a 1 L bed of ArsenX$^{np}$ sorbent. After 1000 BV are passed, the flow is stopped. Essentially all the phosphate in the influent stream is adsorbed onto the sorbent, resulting in a total of 3 g phosphate adsorbed. The phosphate-loaded bed is then regenerated with 8 BV of a 4% w/v potassium hydroxide solution to quantitatively elute the phosphate. The regenerant solution is neutralized to about pH 7 with about 0.4 L of a 15.8 M solution of nitric acid. Thus, the total volume of solution is about 8.4 L and contains 3 g phosphate (equivalent to 2.24 g $P_2O_5$), 223 g potassium (equivalent to 268.6 g $K_2O$), and 391.8 g nitrate (equivalent to 88.5 g nitrogen). The concentrations of nitrogen, phosphate as $P_2O_5$ and potassium as $K_2O$ in percentage terms are as follows: nitrogen: 1.05%; $P_2O_5$: 0.027%; $K_2O$: 3.20%.

The resulting solution may be diluted, and additional phosphate or nitrate may be added as needed to replicate the P, K, and N ratios of commercial fertilizers such as those described in Tables 1 and 2.

EXAMPLE 3

A water influent containing 3 mg/L phosphate is passed through a 1 L bed of ArsenX$^{np}$ sorbent. After 1000 BV are passed, the flow is stopped. Essentially all the phosphate in the influent stream is adsorbed onto the sorbent, resulting in a total of 3 g phosphate adsorbed. The phosphate-loaded bed is then regenerated with 6 BV of a 4% w/v potassium hydroxide solution to quantitatively elute the phosphate. This solution is neutralized to about pH 7 with about 540 mL 7.9 M solution of nitric acid. Thus, about 6.54 L of product solution, containing 3 g phosphate (equivalent to 2.24 g $P_2O_5$), 166.6 g potassium (equivalent to 200.7 g $K_2O$), and 274.3 g nitrate (equivalent to 61.9 g nitrogen) is produced. The concentrations of nitrogen, phosphate as $P_2O_5$ and potassium as $K_2O$ in percentage terms are as follows: Nitrogen: 0.95%; $P_2O_5$: 0.034%; $K_2O$: 3.07%.

As evident by comparing the examples, the concentrations and ratios of N, P and K in the neutralized solution will depend upon the amount of phosphate adsorbed on the medium, the volume of regenerant solution used, the concentration of regenerant solution, and the volume and concentration of nitric acid in the neutralizer solution.

The resultant liquid fertilizer can be used for any agricultural application, including industrial or domestic, and large or small scale. Other trace elements may be added to the solution if required or desired.

A person of ordinary skill in the art will appreciate that the disclosed method generates an ecologically-friendly and beneficial product, i.e., a nitrogen/phosphorus/potassium-containing fertilizer, during regeneration of a sorption material. Previous systems typically generate a waste product that requires hazardous waste disposal methods and incurs associated costs.

As would be apparent to a person of ordinary skill in the art, other embodiments are possible. For example, other sorbents may be regenerated according to the disclosed method. In addition, other configurations of fluid treatment systems can be configured, or reconfigured, to use the inventive method to produce the final product solution. The method may be used to produce a fertilizer when regenerating a sorbent in bulk. The disclosed embodiments are not limiting in any way. Therefore, various changes, modifications or alterations to those embodiments may be made without departing from the scope of the following claims.

What is claimed is:

1. A method for recovering phosphorus desorbed from an influent solution to an adsorptive medium, resulting in a spent medium, the method comprising
contacting the phosphorus containing spent medium with a solution of potassium hydroxide to form a first effluent; and
contacting the first effluent with a solution of nitric acid to form a second effluent, the second effluent containing phosphorus, potassium, and nitrogen.

2. The method of claim 1 wherein the spent sorbent is a metal oxide adsorbent, an ion-exchange adsorbent, or a hybrid adsorbent.

3. The method of claim 1 wherein said phosphorus comprises a phosphate.

4. The method of claim 1 wherein said phosphorus comprises at least one member selected from the group consisting of an orthophosphate anion, a polyphosphate anion, an acid of an orthophosphate anion, and an acid of a polyphosphate anion.

5. The method of claim 1 wherein the second effluent includes potassium, nitrate, and phosphate ions.

6. The method of claim 5 further comprising the step of separating the potassium nitrate and the potassium phosphate from the second effluent.

7. The method of claim 1 wherein the medium comprises a plurality of beads.

8. The method of claim 1 further comprising the step of applying the second effluent as a fertilizer.

9. The method of claim 1 wherein the ratio of nitrogen: phosphorus:potassium in the second effluent is adjusted.

10. The method of claim 1 wherein the second effluent is adjusted to increase the concentration of at least one member selected from the group consisting of nitrogen, phosphorus, and potassium.

11. The method of claim 1 wherein the concentration of potassium hydroxide ranges from about 0.1% to about 10%.

12. The method of claim 1 wherein the concentration of nitric acid ranges from about 1% to about 70%.

* * * * *

UNITED STATES PATENT AND TRADEMARK OFFICE
CERTIFICATE OF CORRECTION

PATENT NO.        : 7,588,744 B1
APPLICATION NO.   : 12/474027
DATED             : September 15, 2009
INVENTOR(S)       : Sylvester It is certified that error appears in the above-identified patent and that said Letters Patent is hereby corrected as shown below:

On the Title Page, Item (60), under Related U.S. Application Data, insert --U.S. Application No. 12/399,643 filed on Mar. 6, 2009-- on the line below "Provisional application No. 61/120,549, filed on Dec. 8, 2008"

Claim 3, Col. 6, Line 25

"said" should read --the--

Claim 4, Col. 6, Line 27

"said" should read --the--

Signed and Sealed this

First Day of December, 2009

David J. Kappos
*Director of the United States Patent and Trademark Office*